United States Patent [19]
Gotoh

[11] Patent Number: 5,095,473
[45] Date of Patent: Mar. 10, 1992

[54] SPLIT TYPE OPTICAL PICK-UP DEVICE

[75] Inventor: Hiroshi Gotoh, Kawasaki, Japan

[73] Assignee: Ricoh Company, Ltd., Tokyo, Japan

[21] Appl. No.: 625,789

[22] Filed: Dec. 10, 1990

Related U.S. Application Data

[63] Continuation of Ser. No. 150,134, Jan. 29, 1988, abandoned.

[30] Foreign Application Priority Data

Jan. 30, 1987 [JP] Japan .................................. 62-19709
Mar. 10, 1987 [JP] Japan ............................ 62-34903[U]
Nov. 12, 1987 [JP] Japan ................................ 62-286322

[51] Int. Cl.$^5$ ............................................... G11B 7/00
[52] U.S. Cl. ............................................... 369/44.14
[58] Field of Search ............... 369/44.12, 44.14, 44.15, 369/44.17, 44.19, 44.22, 32, 112; 250/201.5, 203.2

[56] References Cited

U.S. PATENT DOCUMENTS

| | | | |
|---|---|---|---|
| 4,322,838 | 3/1982 | Neumann | 369/45 |
| 4,367,921 | 1/1983 | Sawamua et al. | 350/164 |
| 4,571,716 | 2/1986 | Szerlip | 369/45 |
| 4,644,516 | 2/1987 | Musha | 369/45 |
| 4,667,316 | 5/1987 | Suda et al. | 369/46 |
| 4,688,201 | 8/1987 | Towner et al. | 369/45 |
| 4,733,065 | 3/1988 | Hoshi et al. | 369/46 |
| 4,822,139 | 4/1989 | Yoshizumi | 369/45 |

Primary Examiner—Donald McElheny, Jr.
Attorney, Agent, or Firm—Cooper & Dunham

[57] ABSTRACT

A split type optical pick-up device suitable for use in an optical disc memory system has a two-part structure: stationary and movable optical systems which are provided separately. The stationary optical system includes a semiconductor laser for emitting a laser beam which is received by a deflecting member of the movable optical system. The thus deflected laser beam is focused onto an optical disc by an objective lens. The light reflecting from the optical disc passes through the objective lens in the reversed direction and also through the deflecting member to impinge upon a tracking error detector which is also provided in the movable optical system. Because of the provision of the tracking error detector in the movable optical system, there will be produced no offset in a tracking signal generated by the tracking error detector.

10 Claims, 4 Drawing Sheets

Fig. 5
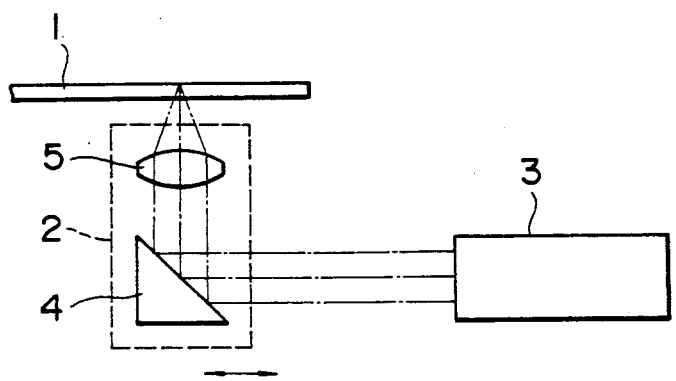
Fig. 6a           Fig. 6b
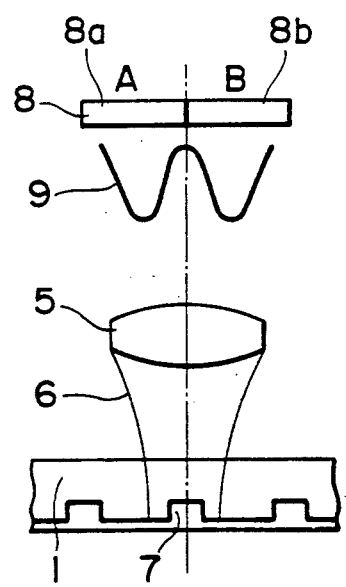   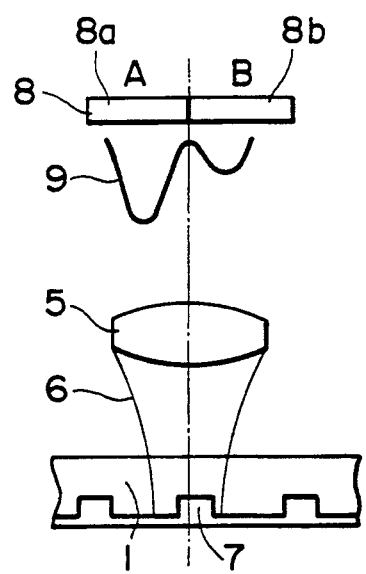

SPLIT TYPE OPTICAL PICK-UP DEVICE

This is a continuation of application Ser. No. 150,134, filed Jan. 29, 1988, now abandoned.

BACKGROUND OF THE INVENTION

1. Field of the Invention

This invention generally relates to an optical pick-up device for use in an optical disc system or the like, and, in particular, to a split type optical pick-up device for writing and reading information to and from an optical disc, which includes a stationary optical system and a movable optical system.

2. Description of the Prior Art

An optical pick-up device of an optical disc memory system is well known, and, in general, such a device includes an objective lens through which a laser beam is passed to form a small light spot on an optical information recording medium, such as an optical disc, thereby allowing to record and read or erase information to and from the recording medium. Such an optical disc system is particularly large in capacity and an optical disc is removable.

In such an optical disc memory system, since an information pit, i.e., a unit of information to be recorded on an optical disc, is extremely small in the order of 1 micron, so that, in order to record and reproduce information to and from an optical disc accurately, it is necessary to carry out focusing control, tracking control and seek control as well known in the art. And, the focusing control is typically carried out by displacing the objective lens along an optical axis thereof, and the tracking control is carried out by displacing the objective lens in the tracking direction or in a direction transverse to a recording track of the optical disc. On the other hand, the seek control is typically carried out such that the overall optical pick-up device is once moved to a location in the vicinity of a target track by a coarse control operation and then a fine control operation is carried out.

However, as compared with the typical prior art magnetic disc memory device, an optical pick-up device weighs several hundreds grams in its entirety. For this reason, according to a control method in which the entire optical pick-up device is moved in the tracking direction, the inertia of the optical pick-up device comes into play during the seek control operation for bringing a laser spot into a position in the vicinity of a desired track by moving the objective lens. Because of this, a high-speed seek operation is difficult to carry out and thus the access time tends to be longer.

In order to cope with this problem, a split type or actuator seek type optical pick-up device is under development so as to realize high-speed accessing in an optical disc memory system. FIG. 5 schematically illustrates such a split type optical pick-up device. As shown in FIG. 5, such a split type optical pick-up device includes a movable optical system 2 which is located opposite to a recording surface of an optical disc 1 as an optical information recording medium and which executes a seek movement in the radial direction of the disc 1. Also provided as optically coupled to the movable optical system 2 is a stationary optical system 3 which is mounted on a mounting device or carriage as fixedly attached thereto. The movable optical system 2 includes a deflecting prism 4 for coupling a laser beam between the optical disc 1 and the stationary optical system 3 by deflecting the laser beam which has travelled in the horizontal direction (in parallel with the optical disc 1) into the vertical direction (toward the recording surface of the optical disc 1) and an objective lens 5 which is disposed opposite to the recording surface of the optical disc 1. On the other hand, the stationary optical system 3 includes a light source, typically a semiconductor laser, and a detector unit for detecting a focusing signal, a tracking signal or an RF signal for reading and reproducing stored data. It is to be noted that in FIG. 5 the tracking direction indicates the right and left direction or radial direction of the optical disc 1 with the optical disc 1 set in position in an optical disc memory system.

The split type optical system under development has a basic feature of separating the entire structure into the movable optical system 2 having the objective lens 5, movable with respect to the optical disc 1, and the stationary optical system 3, whereby the movable optical system 2 is provided to be movable with respect to the optical disc 1 in the tracking direction. With this structure, a laser beam emitted from the stationary optical system 3 is first incident upon the deflecting prism 4 of the movable optical system 2 and it is deflected toward the objective lens 5. And, the laser beam is focused onto the recording surface of the optical disc 1 in the form of a light spot having a predetermined size by means of the objective lens 5. Then, the reflecting light from the optical disc 1 travels the same optical path in the reversed direction to finally reach the stationary optical system 3. Thus, the information carried by this returning light is used to read information recorded on the optical disc 1 or to carry out focusing and tracking controls.

Now, referring to FIGS. 6a and 6b, the principle of operation for detecting a tracking signal will be described below. FIG. 6a illustrates the condition in which a laser light spot 6 condensed by the objective lens 5 is located at the center of a track 7 of the optical disc 1. In this case, since the light spot 6 is located at the center of the track 7, the laser beam is diffracted symmetrically with the track as a center of symmetry. As a result, a pair of light-receiving elements, photoelectric elements, 8a and 8b of a two-division type light-receiving unit 8 for detecting a tracking signal, which is disposed inside of the stationary optical system 3 receives diffracted light having a symmetrical light distribution pattern 9 as shown in FIG. 6a. As a result, outputs A and B from these light-receiving elements 8a and 8b, respectively, are equal in magnitude, i.e., A=B, which indicates the fact that the optical pick-up device is in a proper tracking position. On the other hand, if the location of the light spot 6 is shifted sideways from the centeral position of the track 7 as shown in FIG. 6b, the distribution pattern 9 of diffracted light becomes asymmetrical between right and left, so that there is produced a difference in magnitude between outputs A and B of the respective light-receiving elements 8a and 8b. Under the condition, a tracking control operation is carried out so as to make this difference between outputs A and B to zero.

In such a tracking control operation, in the case of a split type optical pick-up device, only the movable optical system 2, having a relatively small mass, is moved with respect to the optical disc 1, so that the energy for moving an object to effect tracking control may remain relatively low in level and it can be carried out at high speed, e.g., access time within 100 msec. However, such a split type optical pick-up device is not free from drawbacks. For example, in the case where the movable optical system 2 is movably mounted on a carriage, if the movable optical system 2 experiences a displacement in the vertical direction while the carriage moves or if the axis of movement of the carriage is not in parallel with the optical axis of the laser beam emitted from the stationary optical system 3, as the movable optical system 2 moves on the carriage, there is produced an offset in the resulting tracking signal. Described more in detail with this respect referring to FIGS. 7 and 8, while the deflecting prism 4 is located at its initial position indicated by the solid line in FIG. 7, there is obtained a distribution pattern 9 of diffracted light on the tracking detecting light-receiving unit 8 as indicated also by the solid line. Under the condition, a detection signal obtained from the light-receiving unit 8 is so set to have no offset by initial adjustment as shown in FIG. 8a. However, when the deflecting prism 4 has been displaced over a distance d upwardly in the vertical direction as indicated by the phantom line in FIG. 7 due to movement of the movable optical system 2 for focusing control, the light path for the laser beam reflecting from the optical disc 1 and advancing to the light-receiving unit 8 within the stationary optical system 3 through the objective lens 5 and deflecting prism 4 is also shifted in position upwardly over the corresponding distance d. As a result, the diffracted light distribution pattern 9 on the light-receiving unit 8 is also shifted in position as indicated by the phantom line. Accordingly, there is produced an offset in a detection signal obtained from the light-receiving unit 8 as compared with the initial condition as shown in FIG. 8b. With such a tracking detection signal having an offset, the laser light spot 6 will be located at a position away from the central position of the track 7 when a tracking control operation has been carried out, thereby producing an error having an amount delta as shown in FIG. 8b. Therefore, under such a condition, an accurate recording and reproducing operation cannot be carried out.

SUMMARY OF THE INVENTION

In accordance with the principle of the present invention, there is provided a split type optical pick-up device which includes a pair of first and second optical systems which are separate from each other and which may move relative to each other. The present optical pick-up device is suitable for use in an optical disc memory system and in such a system the present optical pick-up device is disposed in association with an optical disc as an optical information recording medium. The first optical system includes a light source for emitting a light beam in a predetermined direction. The light source is preferably comprised of a semiconductor laser. And, the first optical system is preferably provided fixed in position within the optical pick-up device. The first optical system preferably also includes a focusing detector On the other hand, the second optical system includes an objective lens located opposite to an optical information recording medium, such as an optical disc, and deflecting means for deflecting the light beam emitted from the first optical system toward the objective lens, thereby causing the deflected light beam to impinge upon the associated optical information recording medium. The second optical system also includes a tracking detector which is disposed to receive reflecting light from the optical information recording medium through the deflecting means. The second optical system is preferably disposed to be movable in the present optical pick-up device, so that there may be relative movement between the first and second optical systems. With the tracking detector provided in the second movable optical system, no offset will be produced in a tracking signal.

It is therefore a primary object of the present invention to obviate the disadvantages of the prior art as described above and to provide an improved optical pick-up device suitable for use in an optical information recording and reproducing system.

Another object of the present invention is to provide an improved optical pick-up device having a pair of split first and second optical systems which may move relative to each other.

A further object of the present invention is to provide an improved split type optical pick-up device which is prevented from producing an offset in a tracking signal.

A still further object of the present invention is to provide an improved optical pick-up device high in access speed, accurate and reliable in operation, and simple in structure.

Other objects, advantages and novel features of the present invention will become apparent from the following detailed description of the invention when considered in conjunction with the accompanying drawings.

BRIEF DESCRIPTION OF THE DRAWINGS

FIG. 5 is a schematic illustration showing the basic structure of a split type optical pick-up device under development;

FIGS. 6a and 6b are illustrations which are useful for explaining the principle of detecting a tracking signal.

DESCRIPTION OF THE PREFERRED EMBODIMENTS

Figure 1:
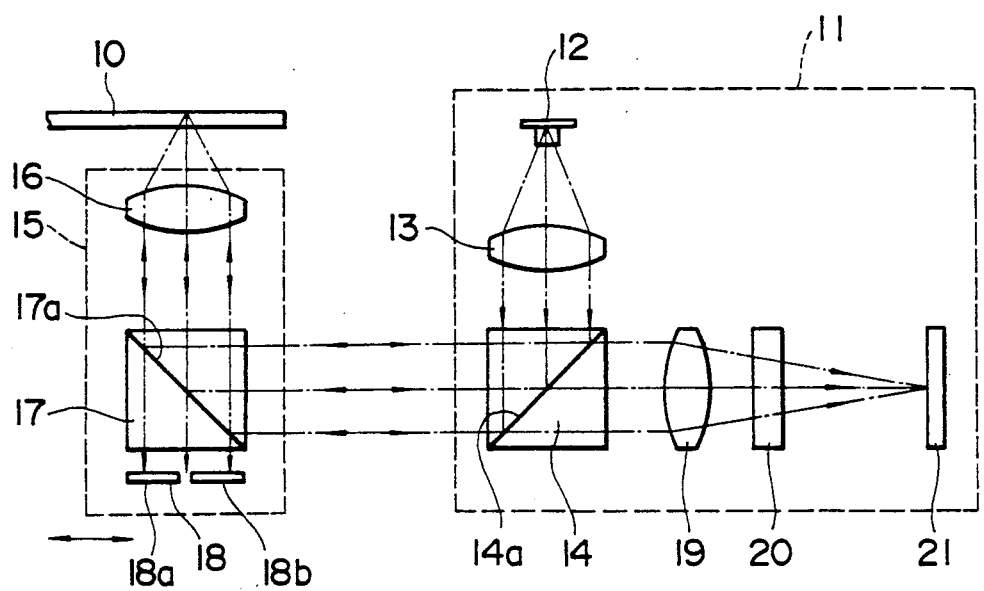
FIG. 1 is a schematic illustration showing the overall structure of a split type optical pick-up device constructed in accordance with one embodiment of the present invention.

Referring now to FIG. 1, there is schematically shown a split type optical pick-up device constructed in accordance with one embodiment of the present invention. The optical pick-up device of FIG. 1 is the case when applied to an optical disc memory system, and, thus, the present optical pick-up device is disposed in association with an optical disc 10 serving as an optical information recording medium. As shown in FIG. 1, the present optical pick-up device includes a first stationary optical system 11 which is provided fixed in position in the present device. In the illustrated embodiment, the stationary optical system 11 includes a semiconductor laser 12 for emitting a laser beam in a predetermined direction, a coupling lens 13 for receiving the laser beam emitted from the laser 12 and collimating the laser beam, and a beam splitter 14 provided with a reflecting film 14a for reflecting the thus collimated laser beam in a predetermined direction which is in parallel with the recording surface of the optical disc 10.

The present optical pick-up device also includes a second movable optical system 15 which is located as spaced apart from the stationary optical system 11 in the radial direction of the optical disc 10 and below the recording surface of the optical disc 10. In the illustrated embodiment, the movable optical system 15 is provided to be movable in a tracking direction of the optical disc 10. The movable optical system 15 includes an objective lens 16 which is located opposite to the recording surface of the optical disc 10 and causes a laser beam to be condensed onto the recording surface of the optical disc 10 in the form of a minute laser beam spot. The movable optical system 15 also includes a beam splitter 17 which serves as a deflecting member for deflecting the laser beam coming from the stationary optical system 11 toward the objective lens 16. In the illustrated embodiment, the beam splitter 17 is provided with a reflecting film 17a at an angle of 45° so as to reflect a major portion of the laser beam coming from the stationary optical system 11 and to allow to pass therethrough the remaining portion of the laser beam coming from the stationary optical system 11.

Of importance, in the illustrated embodiment, the movable optical system 15 also includes a two-division light-receiving unit 18 which includes a pair of light-receiving elements (photoelectric elements) which serves as a tracking error detector. With this structure, the light reflecting from the optical disc 10 first passes through the objective lens 16 and then passes through the reflecting film 17a of the beam splitter 17 to impinge upon the light-receiving element 18 as a tracking detector. Thus, the light-receiving unit 18 is so disposed to receive the light reflecting from the optical disc 10. In the illustrated embodiment, the unit 18 includes a pair of light-receiving elements 18a and 18b which are disposed with the center position between the elements 18a and 18b being in agreement with the optical axis of the objective lens 16. As will be made clear later, a tracking control operation can be carried out by comparing the magnitudes of two outputs obtained from these light-receiving elements 18a and 18b.

On the other hand, the light reflecting from the optical disc 10 has a portion which is reflected by the reflecting film 17a of the beam splitter 17 toward the stationary optical system 11 after passing through the objective lens 16. This returning light from the movable optical system 15 to the stationary optical system 11 is separated from the incident light coming from the semiconductor laser 12 by the beam splitter 14 because this returning light is permitted to pass through the reflecting film 14a of the beam splitter 14. As shown in FIG. 1, in the present embodiment, the stationary optical system 11 also includes a lens 19, a cylindrical lens 20 and a light-receiving unit 21 for detecting a focusing condition in the order mentioned in a light path for the light passing through the reflecting film 14a. It is to be noted that the stationary optical system 11 is preferably provided with other means for reading and reproducing information stored in the optical disc 10.

With the above-described structure, a laser beam emitted from the semiconductor laser 12 within the stationary optical system 11 is deflected by the beam splitter 14 of the stationary optical system 11 and then by the beam splitter 17 of the movable optical system 15, and, then, the thus deflected laser beam is condensed onto the recording surface of the optical disc 10 in the form of a minute light spot by means of the objective lens 16. Then, the light reflecting from the optical disc 10 passes through the objective lens 16 again, this time, in the reversed direction, and, then, it enters into the beam splitter 17. A major portion of the light entering into the beam splitter 17 is reflected by the reflecting film 17a to be returned toward the stationary optical system 11. However, the remaining portion of this light passes through the reflecting film 17a and impinges upon the light-receiving unit 18 which thus produces a tracking (error) signal.

In the above-described embodiment, since the tracking detecting light-receiving unit 18 is provided in the movable optical system 15 with the center of the unit 18 in agreement with the optical axis of the objective lens 16, even if the movable optical system 15 experiences a shift in position in the vertical direction during the movement of a carriage or even if there is a discrepancy in angle between the axis of movement of the carriage and the optical axis of the collimated light travelling from the stationary optical system 11 to the movable optical system 15, the incident condition of the reflecting light from the optical disc 10 to the tracking detection light-receiving unit 18 remains unchanged, and, thus, the possibility of producing an offset in a tracking (error) signal is suitably eliminated. Thus, it is always secured to carry out a tracking control operation to bring the light spot accurately to the center of a track. It is to be noted that the addition of the tracking detecting light-receiving unit 18 to the movable optical system 15 does not cause a significant increase in weight, so that the high-speed access feature by the movable optical system 15 is not hampered.

In the embodiment shown in FIG. 1, the focusing detecting light-receiving unit 21 and its associated elements are provided in the stationary optical system 11, and, thus, there is no increase in weight in the movable optical system 15 by these elements. As will be understood easily, there arises no particular problem even if the focusing (error) detecting system is provided in the stationary optical system 11. That is, a focusing condition detecting operation by the light-receiving unit 21 is carried out such that a focusing error is detected by determining whether the light reflecting from the optical disc 10 has changed to convergent light or to a divergent light from the collimated light. And, thus, no offset is produced in the focusing (error) signal even if there is a shift in position of the movable optical system 15 in the vertical direction or even if there is an inclination in the optical axis.

Figure 2:
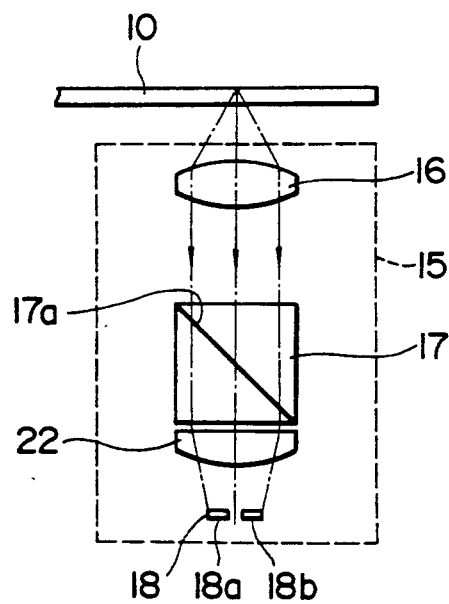
FIG. 2 is a schematic illustration showing a modification of the structure shown in FIG. 1.

FIG. 2 schematically illustrates a modification of the structure shown in FIG. 1. In the modified structure of FIG. 2, a convex lens 22 is additionally provided between the beam splitter 17 and the light-receiving unit 18 of the movable optical system 15. With this modified structure, the light-receiving unit 18 may be made even smaller in size.

Figure 3:
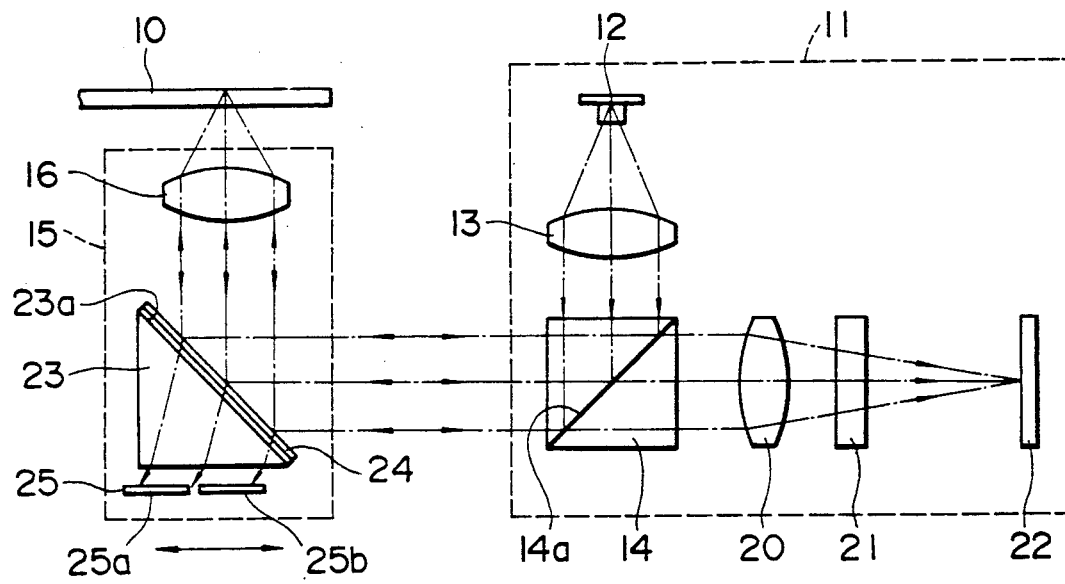
FIG. 3 is a schematic illustration showing the overall structure of a split type optical pick-up device constructed in accordance with another embodiment of the present invention.

Referring now to FIG. 3, there is schematically shown a split type optical pick-up device constructed in accordance with another embodiment of the present invention. Since the present embodiment is similar to the previous embodiment shown in FIG. 1 in many respects, similar elements are indicated by similar numerals. In the present embodiment, in place of the beam splitter 17 of the previous embodiment, provision is made of a prism or half prism 23 as a deflecting member in the movable optical system 15. That is, in the present embodiment, there is provided a prism 23 right triangular in cross section as a deflecting member for deflecting the light coming from the stationary optical system 11 toward the objective lens 16. In the preferred embodiment, the prism 23 has a reflecting surface 23a at 45° which is formed with a dielectric multi-layer film 24. Such a dielectric multi-layer film 24 may be formed by any conventional method, such as coating or evaporation. The dielectric multi-layer film 24 has a beam-splitting function, and, thus, a major portion of light incident thereupon is reflected with the remaining portion of the light permitted to pass therethrough.

Thus, a major portion of the light coming from the stationary optical system 11 is reflected toward the objective lens 16 by this dielectric multi-layer film 24. Then, the light reflecting from the optical disc 10 passes through the objective lens 16 in the reversed direction and then impinges upon the dielectric multi-layer film 24, whereby a portion of the light impinging upon the dielectric multi-layer film 24 passes through the reflecting surface 23a of the prism 23 and then enters into a two-division type light-receiving unit 25 serving as a tracking error detector. Thus, the tracking error detecting light-receiving unit 25 is also provided in the movable optical system 15 similarly with the previous embodiment shown in FIG. 1. The light-receiving unit 15 also includes a pair of light-receiving elements or photoelectric elements 25a and 25b which are arranged side-by-side with the center between the two being located at an optical axis of the objective lens 16 which is defined after passing through the prism 23. Thus, a tracking control operation can be carried out by comparing the magnitudes of outputs obtained from the pair of light-receiving elements 25a and 25b. On the other hand, a major portion of the light reflecting from the optical disc 10 and passing through the objective lens 16 in the reversed direction is reflected by the dielectric multi-layer film 24 on the reflecting surface 23a of the prism 23 toward the stationary optical system 11.

With the above-described structure, a laser beam emitted from the semiconductor laser 12 in the stationary optical system 11 is deflected by the beam splitter 14 of the stationary optical system 11 and then by the dielectric multi-layer film 24 on the prism 23 of the movable optical system 15 toward the objective lens 16, so that the laser beam is focused onto the optical disc 10 in the form of a minute light spot. Then, the light reflecting from the optical disc 10 passes again the objective lens 16 in the reversed direction and again impinges upon the dielectric multi-layer film 24 on the prism 23 this time from above. A major portion of this reflecting light from the optical disc 10 is reflected by the dielectric multi-layer film 24 on the reflecting surface 23a of the prism 23 toward the stationary optical system 11; whereas, the remaining portion of the reflecting light from the optical disc 10 passes through the dielectric multi-layer film 24 and also through the prism 23 to thereby impinge upon the light-receiving unit 25 where a tracking signal is produced. As may have already been understood, the present embodiment operates and functions substantially in the same manner as that of the previously described embodiment, so that, even if the movable optical system 15 experiences an up and down displacement during the movement of the carriage or even if there is a discrepancy in angle between the carriage travelling axis and the optical axis of the collimated light travelling from the stationary optical system 11 to the movable optical system 15, the condition of the light incident upon the light-receiving unit 25 remains unchanged so that there is no chance of producing an offset in a tracking signal, thereby allowing to carry out an accurate tracking control to bring the light spot in registry with the center position of a track. In addition, the provision of the light-receiving unit 25 does not add so much weight to the movable optical system 15, and, thus, the high-speed access feature of the movable optical system 15 is not lost.

In particular, for tracking error detection, the light reflecting from the optical disc .10 must be split into two, and, for this purpose, use may be made of a beam splitter cubic in shape, which is formed by cementing a pair of prisms, each having a right triangular cross section, as a deflecting element as in the previously described embodiment. In the present embodiment, however, use is made of the prism 23 having a right triangular cross section and the dielectric multi-layer film 24 as coated or deposited on its reflecting surface 23a as a beam splitter, which contributes to make the overall weight of the movable optical system 15 smaller.

Figure 4A:
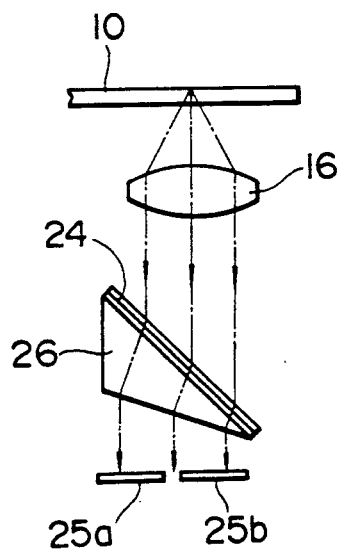
FIGS. 4a and 4b are schematic illustrations showing two alternative modifications of the structure shown in FIG. 3.
Figure 4B:
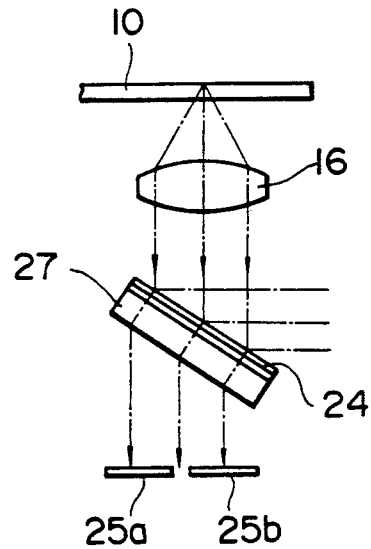
Figure 7:
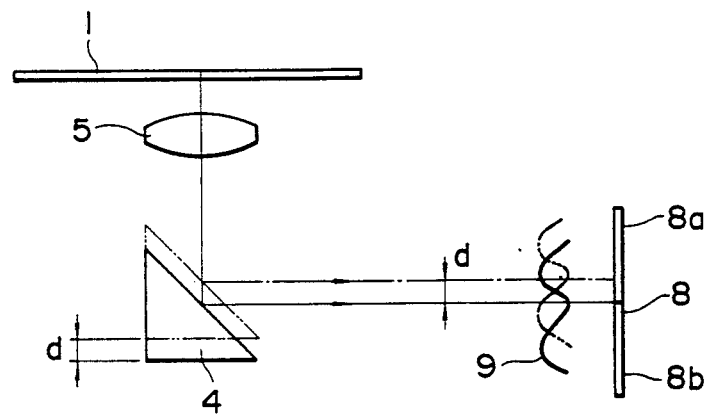
FIGS. 7 and 8a and 8b are illustrations which are useful for understanding how an offset is produced in a tracking signal in the structure shown in FIG. 5.
Figure 8A:
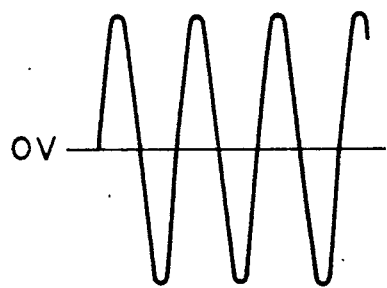
Figure 8B:
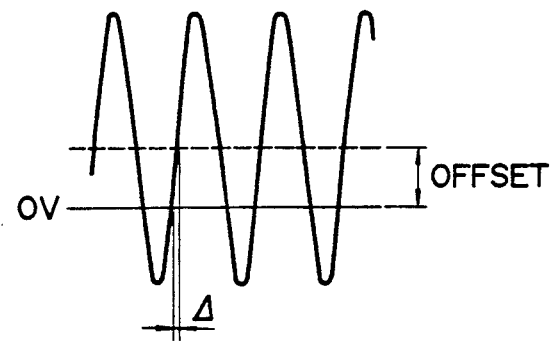

FIGS. 4a and 4b illustrate two alternative modifications of the structure shown in FIG. 3. FIG. 4a shows a modification in which use is made of a prism 26 having a non-right triangular cross sectional shape. In the case of the structure shown in FIG. 3, the light refracted by the prism 23 is incident upon the two-division light-receiving unit 25 obliquely; whereas, in the case of the modified structure shown in FIG. 4a, the light refracted by the prism 26 is incident upon the two-division light-receiving unit 25 substantially at right angles. FIG. 4b shows another modified structure in which the provision is made of a mirror or half mirror 27 having a parallel plate structure at an appropriate angle such that the right passing through the mirror 27 is incident upon the two-division light-receiving unit 25 substantially at right angles. In either of these modifications, the movable optical system 15 can be made lighter in weight.

As described above, in accordance with the principle of the present invention, since the tracking error detector is provided in the movable optical system of a split type optical pick-up device, even if there is a fluctuation in the position of the movable optical system, the positional relationship between the optical axis of the objective lens and the tracking error detector can be maintained unchanged at all times, so that no offset is produced in a tracking (error) signal and an accurate tracking control operation can always be carried out. In addition, the basic feature of high-speed access by the movable optical system is well preserved, and, thus, the present optical pick-up can be moved at high speed without being adversely affected by the inertia effect of the movable optical system. In particular, when use is made of a dielectric multi-layer film having a beam splitting function as a beam deflecting member, use may also be made of a triangular shaped prism or a plate-shaped mirror, which may further contribute the make the overall weight of the movable optical system smaller, thereby allowing to provide an enhanced high-speed access operation.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical pick-up device for use with an optical information recording medium comprising:
   a first optical system and a second optical system, wherein said second optical system is mounted for movement relative to the first optical system and is mounted for movement relative to the optical information recording medium in a focusing direction and in a tracking direction;
   said first optical system including a light source for emitting light;
   said second optical system including deflecting means for deflecting said light from said first optical system in a predetermined direction, focusing means for focusing the thus deflected light onto the optical information recording medium and tracking error detecting means disposed to receive light reflected from said optical information recording medium and to generate a tracking error signal; and
   said first optical system further including focusing error detecting means disposed to receive light reflected from said optical information recording medium;
   wherein movement of said second optical system along said focusing direction leaves substantially unchanged the tracking error signal generated by the tracking error detecting means.

2. The device of claim 1, wherein said first optical system is provided fixed in position in said device and said second optical system is provided to be movable relative to said first optical system.

3. The device of claim 2, wherein said second optical system is movable in a direction transverse to a recording track provided in the optical information recording medium.

4. The device of claim 2, wherein said optical information recording medium is an optical disc which is supported to be rotatable and said second optical system is provided to be movable with respect to said first optical system in a radial direction of said optical disc.

5. The device of claim 1, wherein said deflecting means includes a beam splitter formed by a pair of triangularly shaped prisms cemented together with a reflecting film interposed at an interface between the two prisms.

6. The device of claim 1, wherein said deflecting means includes a dielectric multi-layer film.

7. The device of claim 6, wherein said dielectric multi-layer film is supported on a prism having a right triangular cross section.

8. The device of claim 6, wherein said dielectric multi-layer film is supported on a prism having a triangular cross section free of a right angle.

9. The device of claim 6, wherein said dielectric multi-layer film is supported on a parallel plate.

10. The device of claim 1, wherein said light source is a semiconductor laser.